US008767098B2

(12) United States Patent
Solhusvik

(10) Patent No.: US 8,767,098 B2
(45) Date of Patent: Jul. 1, 2014

(54) METHOD AND APPARATUS FOR REDUCING NOISE IN ANALOG IMAGE DATA OF A CMOS IMAGE SENSOR

(75) Inventor: Johannes Solhusvik, Haslum (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 93 days.

(21) Appl. No.: 13/599,760

(22) Filed: Aug. 30, 2012

(65) Prior Publication Data

US 2014/0063301 A1    Mar. 6, 2014

(51) Int. Cl.
*H04N 9/64* (2006.01)

(52) U.S. Cl.
USPC .......................................... 348/241; 348/246

(58) Field of Classification Search
USPC ........... 348/241, 243, 308; 257/440, 443–448
See application file for complete search history.

(56) References Cited

U.S. PATENT DOCUMENTS

2007/0046513 A1*   3/2007   Ham et al. .................... 341/118
2010/0182468 A1*   7/2010   Posch et al. .................. 348/294

OTHER PUBLICATIONS

Martin-Gonthier, Philippe; Magnan, Pierre. "RTS Noise Impact in CMOS Image Sensors Readout Circuit." 16th IEEE International Conference on Electronics, Circuits, and Systems, 2009, ICECS 2009, Hammamet, Tunisia, Dec. 13-16, 2009. Piscataway NJ: IEEE, 2010, pp. 928-931. ISBN 978-1-4244-5090-9.
Realov, Simeon; Shepard, Kenneth L. "Random Telegraph Noise in 45-nm CMOS: Analysis Using an On-Chip Test and Measurement System." *Electron Devices Meeting (IEDM)*, *2010, IEEE International*. Department of Electrical Engineering, Columbia University, New York, NY (4 pages).
Leyris, C.; Martinez, F.; Valenza, M.; Hoffmann, A.; Vildeuil, J.C.; Roy, F. "Impact of Random Telegraph Signal in CMOS Image Sensors for Low-Light Levels." 2006 IEEE. STMicroelectronics, Crolles, France; Centre d'Electronique et de Micro-optoelectronique, Universite Montpellier II, France (pp. 376-379).

* cited by examiner

*Primary Examiner* — Mekonnen Dagnew
(74) *Attorney, Agent, or Firm* — Blakely Sokoloff Taylor & Zafman LLP

(57) ABSTRACT

A method for preprocessing analog image data to reduce noise in the analog image data that is readout from a pixel array of an image sensor during a sampling time is disclosed. The method includes generating multiple samples of the analog image data during the sampling time and then limiting values of the multiple samples to an upper and lower threshold. The method also includes pre-conditioning the multiple samples by applying a weighting factor to each of the multiple samples in response to when a respective sample was generated during the sampling time. A median value of the multiple samples is then determined and outputted.

13 Claims, 9 Drawing Sheets

METHOD AND APPARATUS FOR REDUCING NOISE IN ANALOG IMAGE DATA OF A CMOS IMAGE SENSOR

TECHNICAL FIELD

This disclosure relates generally to image sensors, and in particular but not exclusively, relates to readout circuits included in complementary metal-oxide-semiconductor (CMOS) image sensors.

BACKGROUND INFORMATION

Image sensors have become ubiquitous. They are widely used in digital still cameras, cellular phones, security cameras, medical devices, automobiles, portable electronic devices and other applications. The technology used to manufacture image sensors, and in particular CMOS image sensor ("CIS"), has continued to advance at a great pace. Modern image sensor applications place demands for faster processing speeds and better image quality, while simultaneously expecting miniaturization in the physical size of the image sensor.

As the physical size of the image sensor gets smaller the need to use smaller MOS transistors increases. However, the use of small MOS transistors in image sensors brings with it various noise sources, such as white (Johnson) noise, 1/f noise, and random telegraph signal (RTS) noise. Conventional image sensors may be designed and fabricated using advanced CMOS process techniques and with advanced transistor devices, such as buried channel transistors, in an attempt to minimize noise, such as RTS noise. However, often even when implementing these techniques some noise, such as RTS noise, may remain.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a method and apparatus for reducing noise in analog image data of a CMOS image sensor are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
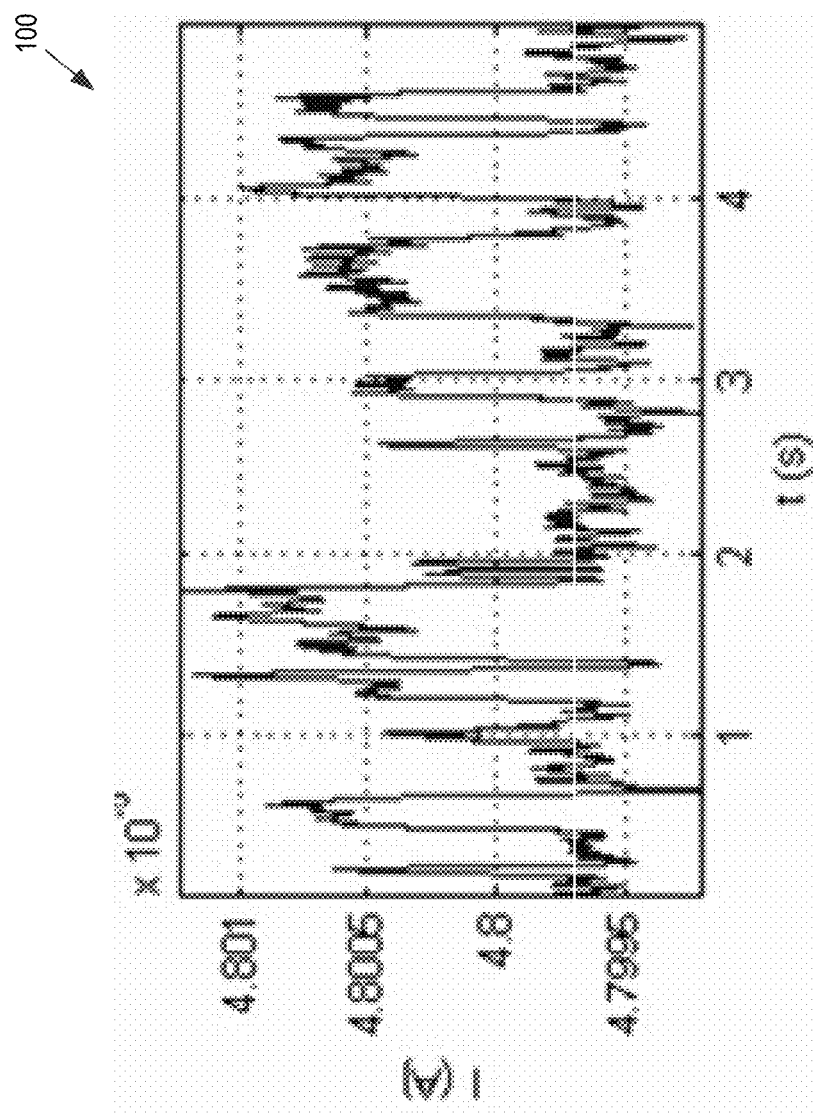
FIG. 1 illustrates current fluctuations due to an individual defect at an Si/SiO2 interface of a small MOSFET.
Figures 2A, 2B:
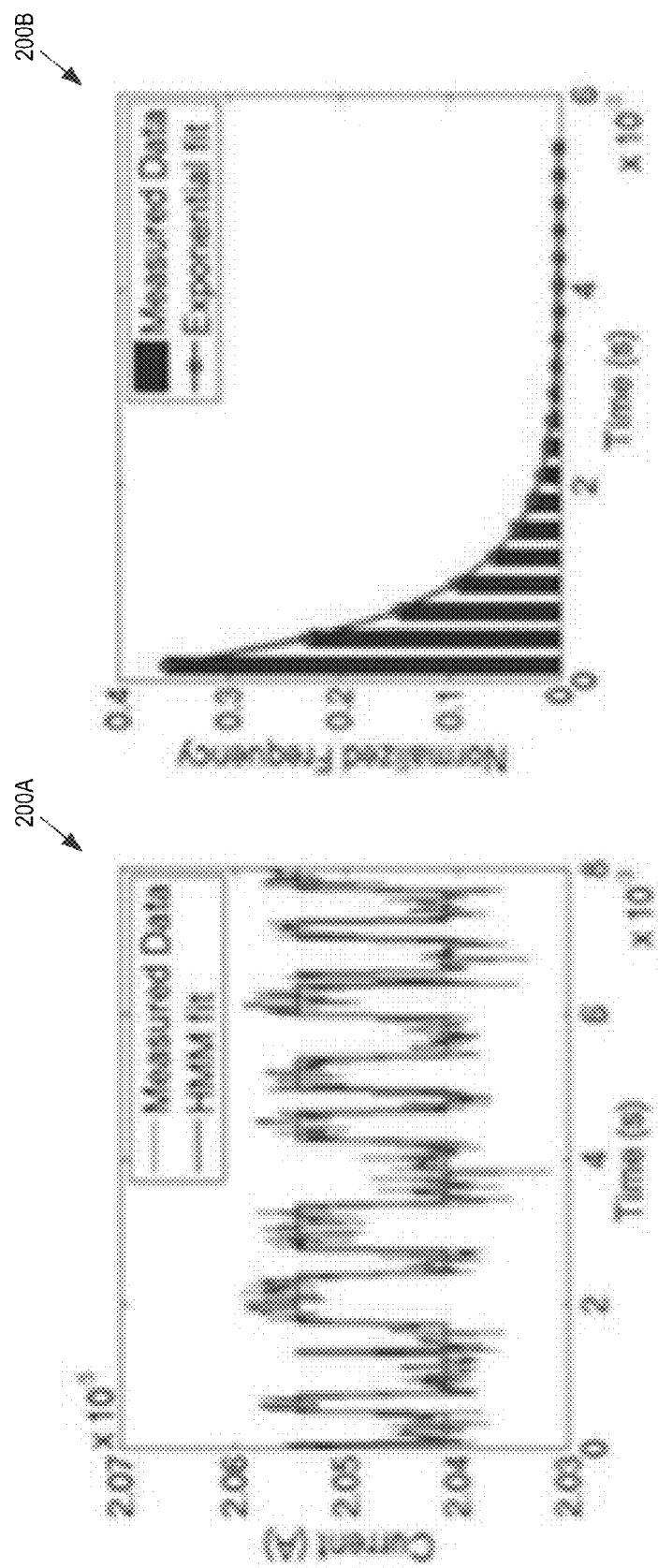
FIG. 2A illustrates idealized random telegraph signal (RTS) noise waveforms.
FIG. 2B is a histogram illustrating normalized frequencies of the idealized RTS waveforms of FIG. 2A.

FIG. 1 illustrates current fluctuations 100 due to a defect at the Si/SiO2 interface of a small MOSFET. In some applications, such as in CMOS image sensors these current fluctuations 100 may appear as flickering pixels which has become more prevalent as transistor sizes have shrunk. For small devices, the carrier number becomes small and the impact of trapping/detrapping events, caused by an interface defect at the Si/SiO2 interface, results in discrete drain current fluctuations (e.g., current fluctuations 100). In some embodiments, each current fluctuation 100 may be referred to as a random telegraph signal (RTS) noise event. As shown in FIG. 1, many of the RTS events are more than half a second in duration and may span an entire correlated double sampling (CDS) period of a CMOS image sensor. However, FIG. 2A illustrates idealized RTS noise waveforms generated using Hidden Markov Model (HMM) software, while FIG. 2B is a histogram illustrating normalized frequencies of the idealized RTS waveforms of FIG. 2A. As shown in FIG. 2B many of the RTS events are very short (e.g., 100 ns-1 μs), which may indeed be shorter than the CDS period of a CMOS image sensor and may be shorter than the reset level sampling time and/or the signal level sampling time of the CDS period, in accordance with embodiments disclosed herein. Accordingly, embodiments of the present invention may reduce noise in a CMOS image sensor by filtering out, or reducing, RTS events having durations that are less than a sampling time of the image sensor. These and other embodiments, will be discussed in more detail below.

Figure 3:
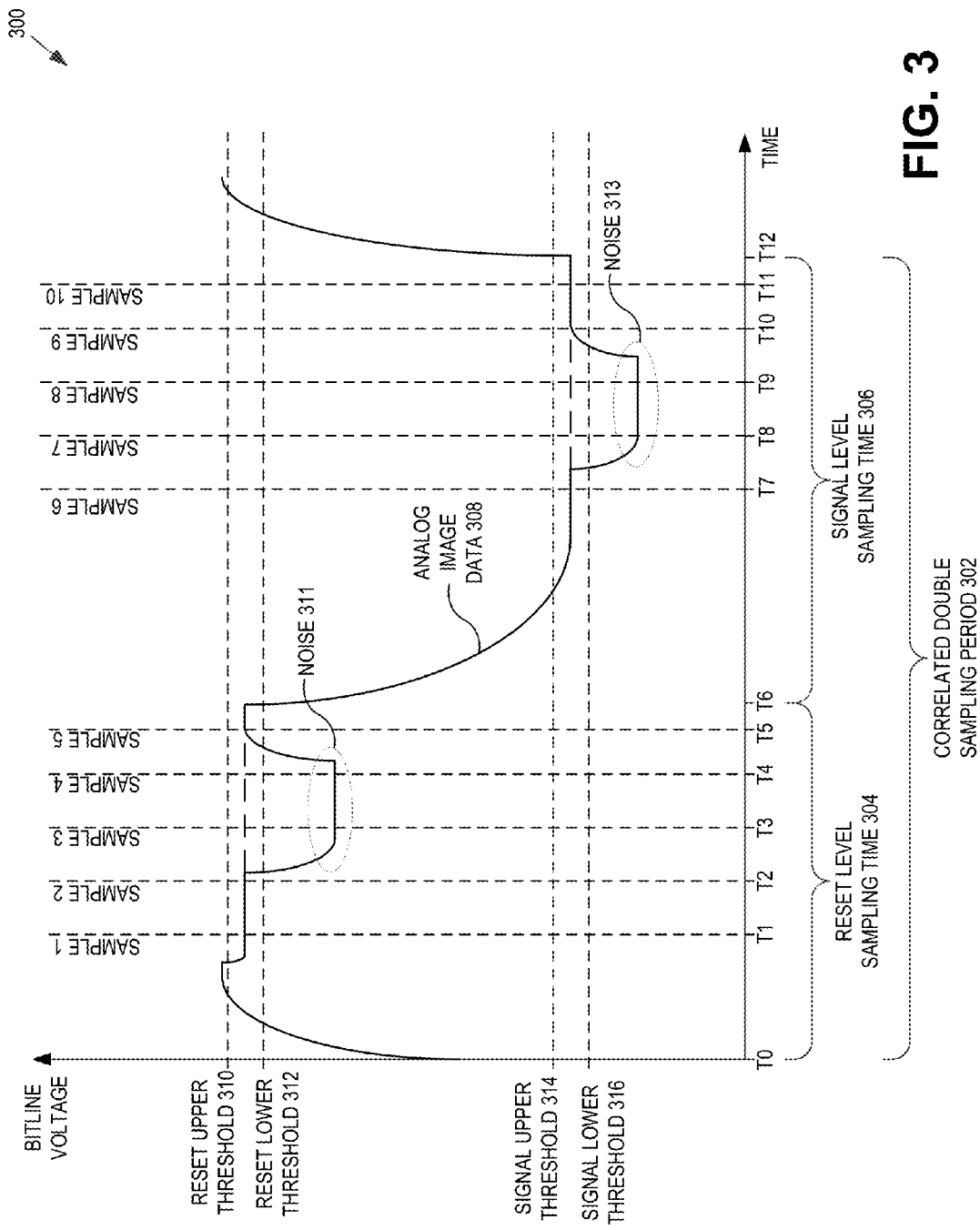
FIG. 3 is a timing diagram illustrating a correlated double sampling period of analog image data, in accordance with an embodiment of the invention.

FIG. 3 is a timing diagram 300 illustrating a CDS period 302 of analog image data 308, in accordance with an embodiment of the invention. Analog image data 308 may be the bit line voltage of a column bit line of a CMOS image sensor (discussed below), and may include a first portion (time T0 to time T6) which represents a reset level sampling time 304, and a second portion (time T6 to time T12) which represents a signal level sampling time 306. The reset level sampling time 304 of analog image data 308 may represent the charge level on an active pixel of the CMOS image sensor immediately after being reset to with a known charge. The signal level sampling time 306 of analog image data 308 represents the charge level on the same active pixel after image acquisition. That is, the analog image data 308 during the signal level sampling time 306 represents the acquired signal of the image sensor.

However, noise may appear during both the reset level sampling time 304 and during the signal level sampling time 306 causing a variance in the analog image data 308 from what it otherwise would be. For example, during the reset level sampling time 304, noise 311 causes a reduction in the analog image data 308 at times T3 and T4. Similarly, noise 313 causes a reduction at time T8 and T9 during the signal level sampling time 306. As shown, the duration of noise event 311 is less than the reset sampling time 304 and the duration of noise event 313 is less than the signal level sampling time 306. Accordingly, embodiments of the present invention may include generating multiple samples of the analog image data 308 during the CDS period 302. In fact, as shown in FIG. 3, multiple samples may be taken during both the reset level sampling time 304 and the signal level sampling time 306. For example, FIG. 3 illustrates samples 1-5 taken at times T1-T5, respectively, during the reset level sampling time 304 and samples 6-10 taken at times T7-T11, respectively, during the signal level sampling time 306. Although FIG. 3 illustrates five samples taken during the reset level sampling time 304 and five samples taken during the signal level sampling time, any number of samples may be taken during each portion of sampling period 302 including one or more. Also, the number of samples taken during the reset level sampling time 304 does not necessarily have to be the same number of samples taken during the signal level sampling time 306. For example, one sample may be taken during the reset level sampling time 304, while 2 or more samples are taken during the signal level sampling time 306.

After the multiple samples are taken of a respective portion of sampling period 302, outliers are then limited. In one embodiment, samples that have a value that exceeds an upper threshold are replaced with the upper threshold and samples that have a value that is less than a lower threshold are replaced with the lower threshold. For example, reset level samples 1, 2, and 5 are between reset upper threshold 310 and reset lower threshold 312 and thus are kept for further processing, while samples 3 and 4 are less than reset lower threshold 312 and are therefore limited (replaced with) to the reset lower threshold 312. Similarly, signal level samples 6, 9, and 10 are between signal upper threshold 314 and signal lower threshold 316 and are thus kept for further processing, while samples 7 and 8 are less than the signal lower threshold 316, which means they will be limited to the signal lower threshold 316.

In some embodiments of a CMOS image sensor, it may be advantageous to favor certain samples over others depending on when a respective sample was acquired during sampling period 302. For example, reset level sample 5 taken towards the end of reset level sampling time 304 may be preferred over reset level samples 1 and 2 taken during the beginning of reset level sampling time 304. Similarly, signal level sample 6 taken during the beginning of signal level sampling time 306 may be preferred over signal level samples 9 and 10 taken towards the end of signal level sampling time 306. Accordingly, embodiments of the present invention may apply weighting factors to each of the remaining samples based on when a sample was acquired during a respective portion of sampling period 302. In one embodiment, the weighting factors applied to each of the multiple samples determines the number of occurrences of each respective sample that will be present in the multiple samples before further pre-processing. By applying higher weighting factors to samples that are taken "close" in time, 1/f noise rejection may be improved. For example, samples taken towards the end of reset level sampling time 304 are closer to samples taken during the beginning of signal level sampling time 306 than the other samples. Thus, a high weighting factor may be applied to reset level sample(s) taken towards the end of reset level sampling time 304 (e.g., sample 5) while a high weighting factor is also applied to signal level sample(s) taken during the beginning of signal level sampling time 306 (e.g., samples 6 and 7).

Figure 4:
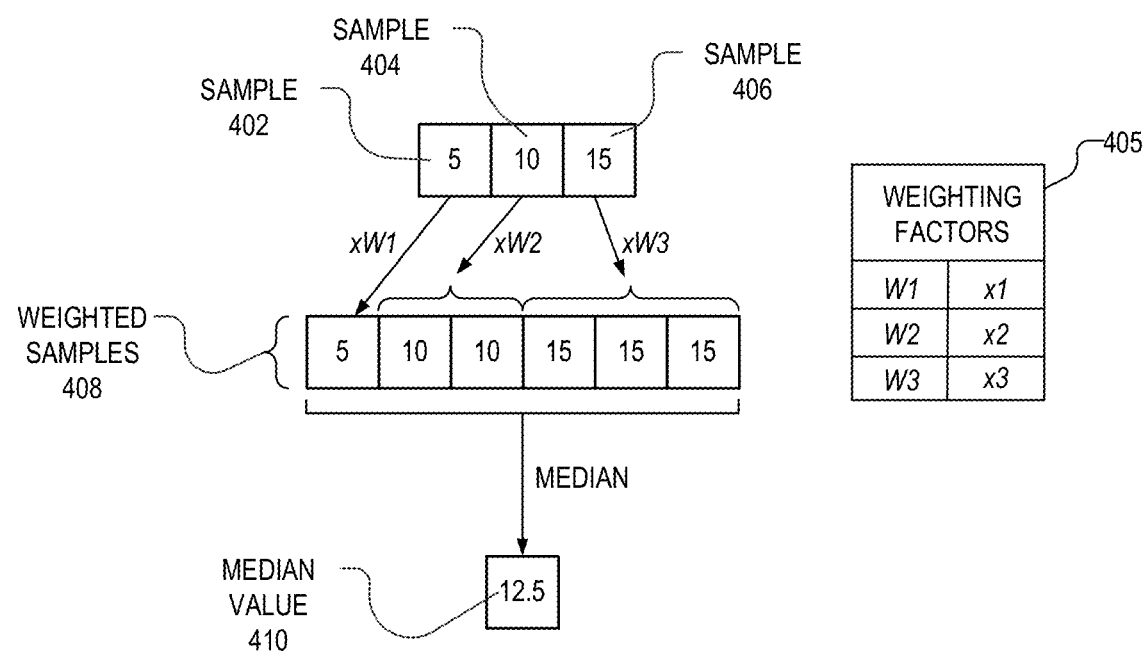
FIG. 4 illustrates pre-conditioning and median filtering of multiple samples of image data, in accordance with an embodiment of the invention.

FIG. 4 illustrates an example weighting factor scheme 405 for applying various weighting factors (i.e., W1-W3) to example samples 402, 404 and 406 to generate weighted samples 408. FIG. 4 includes three samples (402, 404, and 406) for ease of explanation, but any number of samples, such as the five samples shown in FIG. 3, may be used. In the illustrated example, sample 402 has a value of 5, sample 404 has a value of 10, and sample 406 has a value of 15. Applying their respective weighting factors W1 (i.e., x1), W2 (i.e., x2), and W3 (i.e., x3), the resultant weighted samples 408 have one occurrence of sample 402, two occurrences of sample 404, and three occurrences of sample 406. The median value 410 of the weighted samples is then determined and may be forwarded on for further processing within the image sensor. The median value 410 is simply the middle value of the weighted samples 408. However, if there are an even number of weighted samples, such as is shown in FIG. 4, embodiments of the present invention may determine the median value by simply averaging the two middle values. For example, the two middle values of the weighted samples 408 of FIG. 4 are 10 and 15. Thus, the median value 410 is the average of these two middle values (i.e., 12.5).

Figure 5:
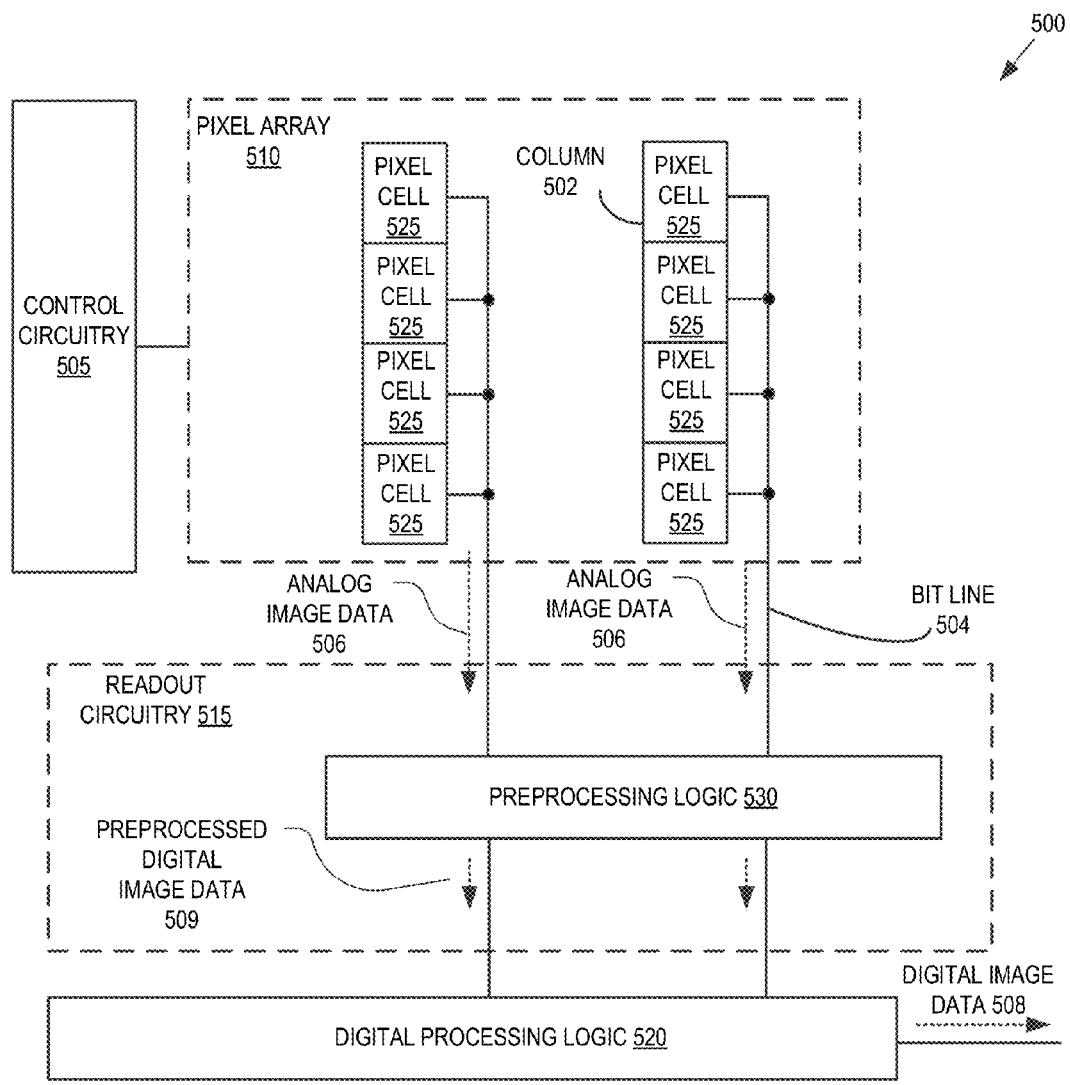
FIG. 5 is a functional block diagram illustrating an image sensor, in accordance with an embodiment of the invention.

FIG. 5 is a functional block diagram illustrating an image sensor 500, in accordance with an embodiment of the invention. The illustrated example of image sensor 500 includes control circuitry 505, pixel array 510, readout circuitry 515, and optional digital processing logic 520. For simplicity of illustration, the illustrated embodiment of pixel array 510 only shows two columns 502, each having four pixel cells 502. However, it is to be appreciated that actual image sensors commonly include from hundreds to thousands of columns, and each column commonly includes from hundreds to thousands of pixels. Also, the illustrated pixel array 510 is regularly shaped (e.g., each column 502 has the same number of pixels), but in other embodiments the array may have a regular or irregular arrangement different than shown and can include more or less pixels, rows, and columns than shown. Moreover, in different embodiments pixel array 510 may be a color image sensor including red, green, and blue pixels designed to capture images in the visible portion of the spectrum, or may be a black-and-white image sensor and/or an image sensor designed to capture images in the invisible portion of the spectrum, such as infra-red or ultraviolet. In one embodiment, image sensor 500 is a complementary metal oxide semiconductor (CMOS) image sensor.

During use, after pixel cell 525 has acquired its charge either during a reset level sampling time or during a signal level sampling time, the analog image data 506 (e.g., analog signal) or charge may be read out of the pixel cell to readout circuitry 515 via column readout lines (e.g., bit lines 504). The analog image data 506 from pixel cells 525 of each column 502 is read out via bit line 504 one pixel at a time to readout circuitry 515 and then transferred to preprocessing logic 530.

Preprocessing logic 530 preprocesses the analog image data 506 to reduce noise, such as the RTS noise discussed above. The preprocessed digital image data 509 may then be forwarded to optional digital processing logic 520 which outputs digital image data 508.

Figure 6:
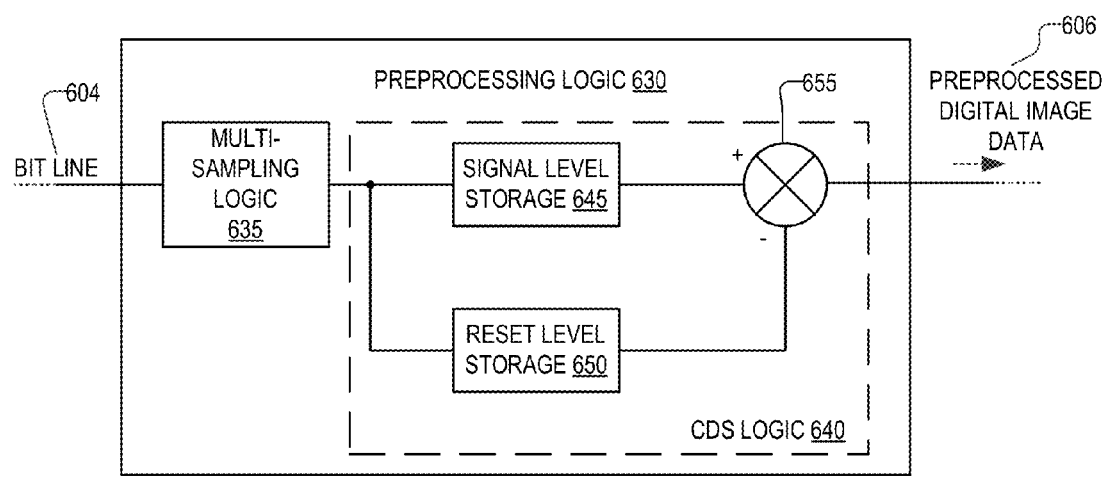
FIG. 6 is a functional block diagram illustrating preprocessing logic, in accordance with an embodiment of the invention.

FIG. 6 is a functional block diagram illustrating preprocessing logic 630, in accordance with an embodiment of the invention. Preprocessing logic 630 is one possible implementation of preprocessing logic 530 of FIG. 5. In the illustrated example of FIG. 6, preprocessing logic 630 includes multi-sampling logic 635 and correlated double sampling (CDS) logic 640. CDS logic 640 is shown as including a signal level storage 645, a reset level storage 650, and an arithmetic operator 655.

As shown in FIG. 6, multi-sampling logic 635 is coupled to receive analog image data via bit line 604. Multi-sampling logic 635 is configured to take multiple samples of the analog image data during a sampling time and to perform analog to digital conversion, outlier limiting, preconditioning, and determining the median value of the multiple samples. The median value determined during the reset level sampling time is output to reset level storage 650, while the median value determined during the signal level sampling time is output to signal level storage 645. In one embodiment, signal level storage 645 and reset level storage 650 each include memory for storing the digital values output from multi-sampling logic 635. In another embodiment, signal level storage 645 and reset level storage 650 are included in a shared memory, such as a shared memory of the CMOS image sensor. Arithmetic operator 655 then combines the value stored in signal level storage 645 with the value stored in the reset level storage 650 to generate the preprocessed analog image data 606. In one embodiment, arithmetic operator 655 subtracts the reset level from the signal level, such that the preprocessed digital image data 606 is the difference between the two values.

Figure 7:
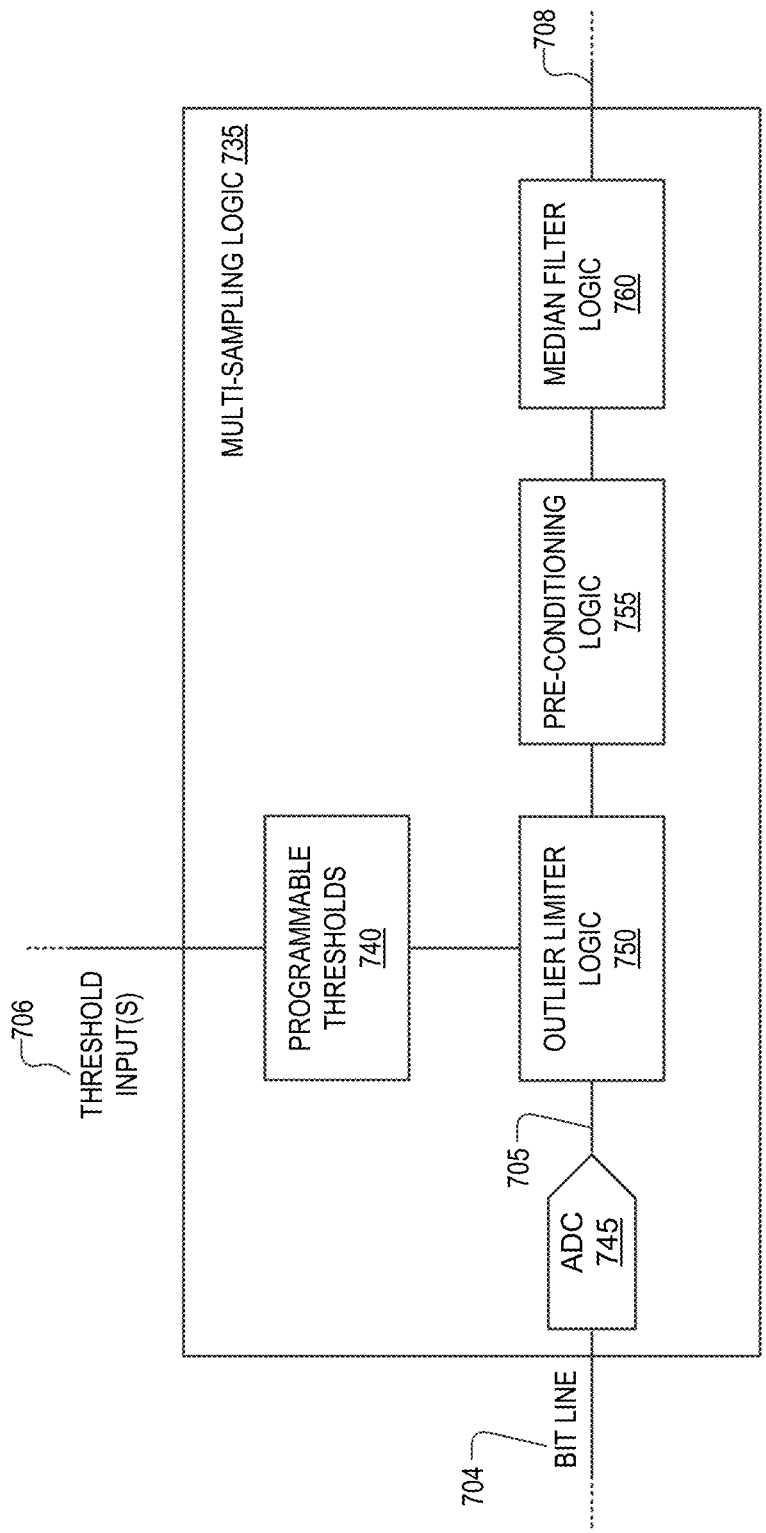
FIG. 7 is a functional block diagram illustrating a multi-sampling circuit, in accordance with an embodiment of the invention.

FIG. 7 is a functional block diagram illustrating a multi-sampling logic 735, in accordance with an embodiment of the invention. Multi-sampling logic 735 is one possible implementation of the multi-sampling logic 635 of FIG. 6. In the illustrated example of FIG. 7, multi-sampling logic 735 includes programmable thresholds 740, analog to digital converter (ADC) 745, outlier removal logic 750, pre-conditioning logic 755, and median filter logic 760.

As shown in FIG. 7, ADC 745 is coupled to receive analog image data via bit line 704. ADC 745 is configured to sample and convert the value of the analog image data multiple times during a sampling time (e.g., signal level sampling time 306). In one embodiment, the ADC 745 is controlled by control circuitry 505 of FIG. 5. The digital data 705 that is output by ADC 745 is provided to outlier limiter logic 750 which will limit the value if it is greater than an upper threshold and also if it is lower than a lower threshold. The upper and lower thresholds used by outlier limiter circuit 750 may be programmable thresholds 740. Thus, one or more of the reset upper threshold, the reset lower threshold, the signal upper threshold, and the signal lower threshold may be programmable. In one embodiment, the upper and lower thresholds are received from control circuitry 505 via threshold input 706. By way of example, programmable thresholds 740 may be programmed during a test and trim phase of manufacturing the CMOS image sensor. In another example, the programmable thresholds 740 may be programmed by a system designer after deployment when incorporated into a system (e.g., a camera). In yet another embodiment, the programmable threshold 740 may be dynamically programmed during operation of the CMOS image sensor to dynamically adjust the sensor's sensitivity to noise.

The multiple samples are then forwarded on to pre-conditioning logic 755 which applies a weighting factor to the sample based on when the sample was taken with respect to the sampling time. In one embodiment, a greater weighting factor is applied to samples taken at or near the beginning of the sampling time than those applied to samples taken at or near the end of the sampling time.

The pre-conditioned sample is then output to median filter logic 760. In one embodiment, median filter logic 760 includes memory to store the multiple samples and is configured to determine the median value of the stored samples. Median filter logic 760 then outputs a digital preprocessed sample level 708 that is representative of the median value for further processing.

The operation of preprocessing logic 630 having a multi-sampling logic 635, will now be described with reference to FIGS. 6-9. In process block 805 of the process 800, illustrated in FIG. 8, multi-sampling logic 635 begins receiving analog image data. In process block 810 multi-sampling logic 635 preprocesses the analog image data received during the reset level sampling time.

Figure 9:
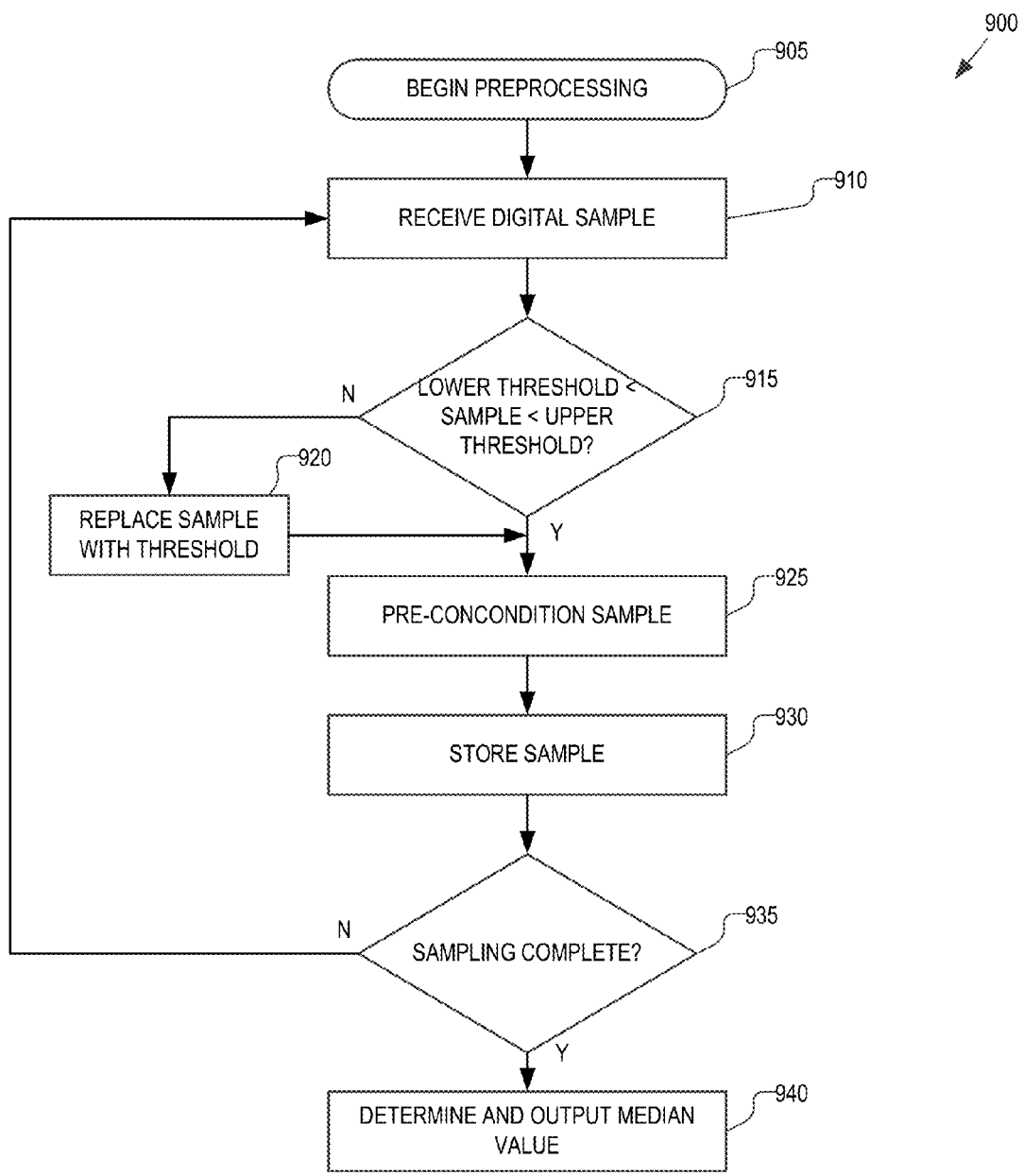
FIG. 9 is a flow diagram illustrating a process of preprocessing analog image data, in accordance with an embodiment of the invention.

Turning now to FIG. 9, the preprocessing of the reset level will now be described with reference to process 900. Preprocessing begins in process block 905. Next, in process block 910, ADC 745 takes first sample of the analog image data. Next, in decision block 915 outlier limiter logic 750 determines whether the sample is between the reset lower threshold and the reset upper threshold. If not, process 900 proceeds to process block 920, where outlier limiter logic 750 replaces the sample with the appropriate threshold (e.g., lower threshold if the sample is less than the lower threshold, and upper threshold if the sample exceeds the upper threshold). If, in decision block 915, the sample is indeed between the reset lower threshold and the reset upper threshold, process 900 proceeds to block 925 where preconditioning logic 755 preconditions the sample by applying a weighting factor to the sample depending on when the sample was acquired. In one embodiment, the preconditioning logic 755 may include a counter (not shown) that tracks the sample that is currently being preconditioned so as to apply the appropriate weighting factor. Next, in process block 930 the preconditioned sample(s) are stored in memory for use by median filter logic 760. Decision block 935 determines whether all the sampling has been completed for the reset level sampling time of the analog image data. If not, process returns to process block 910 to begin preprocessing the next sample. If sampling is complete (i.e., multiple samples have been generated), then median filter logic 760 determines the median value of the stored samples and outputs that value as the preprocessed reset level.

Figure 8:
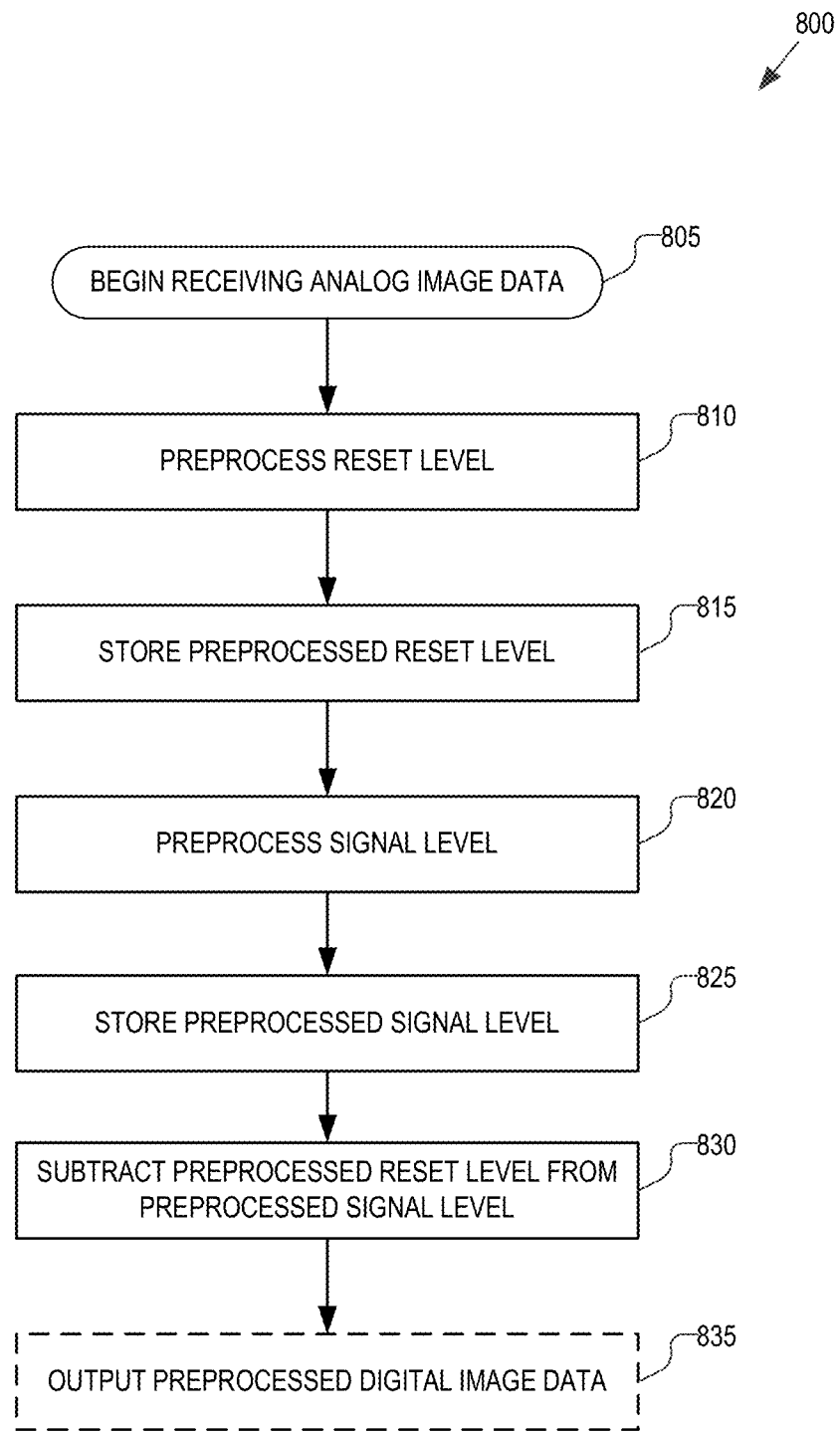
FIG. 8 is a flow diagram illustrating a process of reading out analog image data of an image sensor, in accordance with an embodiment of the invention.

Returning now to process 800 of FIG. 8, the preprocessed reset level is then stored in process block 815 by reset level storage 650. Next, in process block 820, the signal level of the analog image data is preprocessed. During the signal level sampling time, the analog image data is preprocessed the same as with the reset level discussed above. That is, process 900 also performs the preprocessing of the signal level, only this time using the signal upper and lower thresholds for outlier limiting.

Proceeding now to process block 825, the preprocessed signal level is stored by signal level storage 645. Next, in process block 830, arithmetic operator 655 subtracts the preprocessed reset level from the preprocessed signal level to output a preprocessed analog image data 606. The preprocessed digital image data 606 may then output to digital process logic for optional further digital processing.

The order in which some or all of the process blocks appear in each process should not be deemed limiting. Rather, one of ordinary skill in the art having the benefit of the present disclosure will understand that some of the process blocks may be executed in a variety of orders not illustrated. For example, in process 800, preprocessing of the signal level 820 may be performed prior to the preprocessing of the reset level 810. Also, in process 900, the preconditioning of samples 925 may be performed prior to the outlier removal of process blocks 915 and 920.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor for generating image data, the image sensor comprising:
    a pixel array including a plurality of pixel cells arranged into rows and columns for generating analog image data;
    a bit line coupled to at least one of the pixels within a column of the pixel array; and
    readout circuitry coupled to the bit line to readout the analog image data during a sampling time, the readout circuitry including:
        preprocessing logic coupled to the bit line for preprocessing the analog image data to reduce noise, wherein the preprocessing of the analog image data includes,
            generating multiple samples of the analog image data during the sampling time;
            limiting values of the multiple samples by:
                replacing the multiple samples that have a value that exceeds a programmable upper threshold with the programmable upper threshold, and
                replacing the multiple samples that have a value that is less than a programmable lower threshold with the programmable lower threshold;
            pre-conditioning the multiple samples by applying a weighting factor to each of the multiple samples in response to when a respective sample was generated during the sampling time; and
            determining and outputting a median value of the multiple samples, wherein the sampling time is a signal level sampling time of a correlated double sampling (CDS) period, and wherein the readout circuitry is configured to readout analog image data during the signal level sampling time and during a reset level sampling time of the CDS period, wherein the preprocessing of the analog image data includes preprocessing a reset level and preprocessing a signal level.

2. The image sensor of claim 1, wherein the preprocessing logic includes an ADC coupled to receive the analog image data, and wherein generating the multiple samples includes converting the analog image data into digital data.

3. The image sensor of claim 1, wherein the sampling time is a reset level sampling time of a correlated double sampling (CDS) period.

4. The image sensor of claim 1, wherein the preprocessing logic further includes a correlated double sampling (CDS) circuit coupled to subtract the preprocessed reset level from the preprocessed signal level of the analog image data.

5. The image sensor of claim 1, wherein pre-conditioning the multiple samples includes:
    applying a higher weighting factor to samples taken later in the reset level sampling time than to samples taken earlier in the reset level sampling time; and
    applying a higher weighting factor to samples taken earlier in the signal level sampling time than to samples taken later in the signal level sampling time.

6. The image sensor of claim 1, wherein the weighting factors applied to each of the multiple samples determines a number of occurrences of each respective sample in the multiple samples before determining the median value.

7. The image sensor of claim 1, wherein the noise reduced by the preprocessing logic includes at least one noise event having a duration that is less than the sampling time.

8. A method for preprocessing analog image data to reduce noise in the analog image data that is readout from a pixel array of an image sensor during a sampling time, the method comprising:
    generating multiple samples of the analog image data during the sampling time, wherein the sampling time is a signal level sampling time of a correlated double sampling (CDS) period;
    limiting values of the multiple samples by:
        replacing the multiple samples that have a value that exceeds a programmable upper threshold with the programmable upper threshold, and
        replacing the multiple samples that have a value that is less than a programmable lower threshold with the programmable lower threshold;
    pre-conditioning the multiple samples by applying a weighting factor to each of the multiple samples in response to when a respective sample was generated during the sampling time, wherein pre-conditioning the multiple samples includes:
        applying a higher weighting factor to samples taken later in the reset level sampling time than to samples taken earlier in the reset level sampling time; and
        applying a higher weighting factor to samples taken earlier in the signal level sampling time than to samples taken later in the signal level sampling time;
    determining and outputting a median value of the multiple samples; and
    reading out analog image data during a reset level sampling time of the CDS period, wherein the preprocessing of the analog image data includes preprocessing a reset level and preprocessing a signal level.

9. The method of claim 8, wherein generating the multiple samples includes converting the analog image data into digital data.

10. The method of claim 8, wherein the sampling time is a reset level sampling time of a correlated double sampling (CDS) period.

11. The method of claim 8, further comprising subtracting the preprocessed reset level from the preprocessed signal level of the analog image data.

12. The method of claim 8, wherein the weighting factors applied to each of the multiple samples determines a number of occurrences of each respective sample in the multiple samples before determining the median value.

13. The method of claim 8, wherein the noise reduced by the preprocessing logic includes at least one noise event having a duration that is less than the sampling time.

* * * * *